(12) United States Patent
Nandi et al.

(10) Patent No.: US 7,694,063 B1
(45) Date of Patent: Apr. 6, 2010

(54) SYSTEM AND METHOD FOR DYNAMICALLY LOADABLE STORAGE DEVICE I/O POLICY MODULES

(75) Inventors: Siddhartha Nandi, Maharashtra (IN); Abhay Kumar Singh, Pune (IN); Oleg Kiselev, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 0 days.

(21) Appl. No.: 11/584,309

(22) Filed: Oct. 20, 2006

Related U.S. Application Data

(62) Division of application No. 10/717,037, filed on Nov. 19, 2003, now Pat. No. 7,127,545.

(51) Int. Cl.
*G06F 13/00* (2006.01)
*G06F 13/28* (2006.01)

(52) U.S. Cl. ............................ 710/316; 711/114
(58) Field of Classification Search ............... 710/316; 711/114
See application file for complete search history.

(56) References Cited

U.S. PATENT DOCUMENTS

| | | | |
|---|---|---|---|
| 4,396,984 A | 8/1983 | Videki, II | 710/38 |
| 5,557,482 A | 9/1996 | Christensen et al. | 360/53 |
| 5,944,838 A | 8/1999 | Jantz | 714/6 |
| 6,145,028 A | 11/2000 | Shank et al. | 710/31 |
| 6,269,410 B1 | 7/2001 | Spasojevic | 710/5 |
| 6,591,309 B1 | 7/2003 | Shah | 710/2 |
| 6,622,300 B1 | 9/2003 | Krishnaswamy et al. | 717/130 |
| 6,625,747 B1 | 9/2003 | Tawil et al. | 714/6 |
| 6,636,905 B1 | 10/2003 | McNamer et al. | 710/15 |
| 6,691,184 B2 | 2/2004 | Odenwald et al. | 710/41 |
| 6,697,924 B2 * | 2/2004 | Swank | 711/163 |
| 6,802,021 B1 * | 10/2004 | Cheng et al. | 714/4 |
| 2001/0050915 A1 | 12/2001 | O'Hare et al. | 370/400 |
| 2002/0019909 A1 | 2/2002 | D'Errico | 711/114 |
| 2002/0133491 A1 | 9/2002 | Sim et al. | 707/10 |
| 2003/0014504 A1 | 1/2003 | Hess et al. | 709/220 |
| 2003/0023713 A1 | 1/2003 | Slater et al. | 709/223 |
| 2003/0023893 A1 | 1/2003 | Lee et al. | 714/4 |
| 2003/0061546 A1 | 3/2003 | Collins et al. | 714/42 |

(Continued)

FOREIGN PATENT DOCUMENTS

EP    0788055 A2    6/1997

(Continued)

OTHER PUBLICATIONS

"Highly Available Storage: Multipathing and the Microsoft MPIO Driver Architecture," White Paper, Microsoft® Windows Server System; Published Oct. 2003, pp. 1-14.

(Continued)

*Primary Examiner*—Mark Rinehart
*Assistant Examiner*—Jeremy S Cerullo
(74) *Attorney, Agent, or Firm*—Campbell Stephenson, LLP

(57) ABSTRACT

Systems, methods, apparatus and software can implement a multipathing driver using dynamically loadable device policy modules that provide device specific functionality for providing at least one of input/output (I/O) operation scheduling, path selection, and I/O operation error analysis. Because the device policy modules include device specific functionality, various different devices from different manufacturers can be more efficiently and robustly supported.

20 Claims, 8 Drawing Sheets

U.S. PATENT DOCUMENTS

| | | | |
|---|---|---|---|
| 2003/0172182 A1 | 9/2003 | Clay et al. | 709/241 |
| 2003/0172331 A1* | 9/2003 | Cherian et al. | 714/712 |
| 2003/0196003 A1 | 10/2003 | Shah | 710/2 |
| 2004/0025162 A1 | 2/2004 | Fisk | 718/105 |
| 2004/0064461 A1 | 4/2004 | Pooni et al. | 707/100 |
| 2004/0064594 A1 | 4/2004 | Pooni et al. | 710/1 |
| 2004/0243699 A1 | 12/2004 | Koclanes et al. | 709/224 |
| 2005/0021915 A1 | 1/2005 | Lowe et al. | 71/154 |

FOREIGN PATENT DOCUMENTS

| | | |
|---|---|---|
| EP | 1246060 A1 | 2/2002 |
| JP | 200330924 A2 | 11/2000 |
| JP | 2003099384 A2 | 4/2003 |
| WO | WO 02/50682 A2 | 6/2002 |
| WO | WO 02/091689 A1 | 11/2002 |
| WO | WO 02/091690 A2 | 11/2002 |

OTHER PUBLICATIONS

Network Storage Forum, "VERITAS Introduces Two New Software Capabilities," 2001, Network Storage Forum, http://www.internetnews.com/storage/article.php/890241.

VERITAS, "VERITAS Enabled Arrays—Introduction to the Array Support Library," VERITAS, http://seer.support.veritas.com/docs/249446.html.

Wikipedia, "Kernel (computer science)", Wikipedia, http://wikipedia.org/wiki/kernel_(computer) .

"Fault Tolerant Storage Multipathing and Clustering Solutions for Open Systems for the IBM ESS," IBM International Technical Support Organization, First Edition (Apr. 2002), pp. 1-238, Emphasis on Chapters 1-3, pp. 1-43.

\* cited by examiner

SYSTEM AND METHOD FOR DYNAMICALLY LOADABLE STORAGE DEVICE I/O POLICY MODULES

This application is a division of U.S. patent application Ser. No. 10/717,037, entitled "System And Method For Dynamically Loadable Storage Device I/O Policy Modules," filed Nov. 19, 2003 now U.S. Pat. No. 7,127,545, and naming Siddhartha Nandi, Abhay Kumar Singh, and Oleg Kiselev as the inventors. The above-referenced application is hereby incorporated herein by reference in its entirety.

FIELD OF THE INVENTION

The present invention relates to storage devices in distributed computer systems and, more particularly, to coordinating the use of storage devices with multiple paths.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability situations. Such distributed computing systems typically utilize one or more storage devices in support of the computing systems operations. These storage devices can be quite numerous and/or heterogeneous. In an effort to aggregate such storage devices and to make such storage devices more manageable and flexible, storage virtizalization techniques are often used. Storage virtualization techniques establish relationships between physical storage devices, e.g. disk drives, tape drives, optical drives, etc., and virtual or logical storage devices such as volumes, virtual disks, and virtual logical units (sometimes referred to as virtual LUNs). In so doing, virtualization techniques provide system-wide features, e.g., naming, sizing, and management, better suited to the entire computing system than those features dictated by the physical characteristics of storage devices. Additionally, virtualization techniques enable and/or enhance certain computing system operations such as clustering and data backup and restore.

FIG. 1 illustrates a simplified example of a computing system 100. The members of the computing system 100 include host 130 and host 140. As members of computing system 100, hosts 130 and 140, typically some type of application, data, or file server, are often referred to "nodes." Hosts 130 and 140 can be designed to operate completely independently of each other, or may interoperate to form some manner of cluster. Thus, hosts 130 and 140 are typically individual computer systems having some or all of the software and hardware components well known to those having skill in the art. FIG. 8 (described below) illustrates some of the features common to such computer systems. In support of various applications and operations, hosts 130 and 140 can exchange data over, for example, network 120, typically a local area network (LAN), e.g., an enterprise-wide intranet, or a wide area network (WAN) such as the Internet. Additionally, network 120 provides a communication path for various client computer systems 110 to communicate with hosts 130 and 140. In addition to network 120, hosts 130 and 140 can communicate with each other over a private network (not shown).

Other elements of computing system 100 include storage area network (SAN) 150 and storage devices such as tape library 160 (typically including one or more tape drives), a group of disk drives 170 (i.e., "just a bunch of disks" or "JBOD"), and intelligent storage array 180. As shown in FIG. 1, both hosts 130 and 140 are coupled to SAN 150. SAN 150 is conventionally a high-speed network that allows the establishment of direct connections between storage devices 160, 170, and 180 and hosts 130 and 140. SAN 150 can also include one or more SAN specific devices such as SAN switches, SAN routers, SAN hubs, or some type of storage appliance. Thus, SAN 150 is shared between the hosts and allows for the sharing of storage devices between the hosts to provide greater availability and reliability of storage. Although hosts 130 and 140 are shown connected to storage devices 160, 170 and 180 through SAN 150, this need not be the case. Shared resources can be directly connected to some or all of the hosts in the computing system, and computing system 100 need not include a SAN. Alternatively, hosts 130 and 140 can be connected to multiple SANs.

FIG. 2 illustrates in greater detail several components of computing system 100. For example, disk array 180 is shown to include two input/output (I/O) ports 181 and 186. Associated with each I/O port is a respective storage controller (182 and 187), and each storage controller generally manages I/O operations to and from the storage array through the associated I/O port. In this example, each storage controller includes a processor (183 and 188), a cache memory (184 and 189) and a regular memory (185 and 190). Although one or more of each of these components is typical in disk arrays, other variations and combinations are well known in the art. The disk array also includes some number of disk drives (logical units (LUNs) 191-195) accessible by both storage controllers. As illustrated, each disk drive is shown as an LUN which is generally an indivisible unit presented by a storage device to its host(s). Logical unit numbers, also sometimes referred to as LUNs, are typically assigned to each disk drive in an array so the host can address and access the data on those devices. In some implementations, an LUN can include multiple devices, e.g., several disk drives, that are logically presented as a single device.

FIG. 2 also illustrates some of the software and hardware components present in hosts 130 and 140. Both hosts 130 and 140 execute one or more application programs (131 and 141) respectively. Such applications can include, but are not limited to, database administration systems (DBMS), file servers, application servers, web servers, backup and restore software, customer relationship management software, and the like. The applications and other software not shown, e.g., operating systems, file systems, and applications executing on client computer systems 110 can initiate or request I/O operations against storage devices such as disk array 180. Hosts 130 and 140 also execute volume manager (133 and 143) which enables physical resources configured in the computing system to be managed as logical devices. An example of software that performs some or all of the functions of volume manager 330 is the VERITAS Volume Manager™ product provided by VERITAS Software Corporation. Hosts 130 and 140 take advantage of the fact that disk array 180 has more than one I/O port using dynamic multipathing (DMP) drivers (135 and 145) as well as multiple host bus adaptors (HBAs) 137, 139, 147, and 149. The HBAs provide a hardware interface between the host bus and the storage network, typically implemented as a Fibre Channel network. Hosts 130 and 140 each have multiple HBAs to provide redundancy and/or to take better advantage of storage devices having multiple ports.

The DMP functionality enables greater reliability and performance by using path failover and load balancing. In general, the multipathing policy used by DMP drivers 135 and 145 depends on the characteristics of the disk array in use. Active/active disk arrays (A/A arrays) permit several paths to be used concurrently for I/O operations. Such arrays enable DMP to provide greater I/O throughput by balancing the I/O load uniformly across the multiple paths to the disk devices. In the event of a loss of one connection to an array, the DMP driver automatically routes I/O operations over the other available connections to the array. Active/passive arrays in so-called auto-trespass mode (A/P arrays) allow I/O operations on a primary (active) path while a secondary (passive) path is used if the primary path fails. Failover occurs when I/O is received or sent on the secondary path. Active/passive arrays in explicit failover mode (A/PF arrays) typically require a special command to be issued to the array for failover to occur. Active/passive arrays with LUN group failover (A/PG arrays) treat a group of LUNs that are connected through a controller as a single failover entity. Failover occurs at the controller level, and not at the LUN level (as would typically be the case for an A/P array in auto-trespass mode). The primary and secondary controller are each connected to a separate group of LUNs. If a single LUN in the primary controller's LUN group fails, all LUNs in that group fail over to the secondary controller's passive LUN group.

Implementation of the above-described multipathing policies depends in large part on the specific hardware present in the storage devices in use. Where there is sufficient commonality among the storage devices to be supported, or where only a single type of storage device is to be supported, implementation of theses multipathing policies is relatively straight forward. However, in heterogeneous environments where storage devices of different types, different models, and/or from different manufactures are present and/or anticipated, multipathing support will typically need to rely on implementations specific to the various different devices.

Accordingly, it is desirable to have efficient and convenient mechanisms for providing multipathing functionality that is specific to particular storage devices without having to provide completely separate multipathing drivers for each supported storage device.

SUMMARY OF THE INVENTION

It has been discovered that systems, methods, apparatus and software can implement a multipathing driver using dynamically loadable device policy modules that provide device specific functionality for providing at least one of input/output (I/O) operation scheduling, path selection, and I/O operation error analysis. Because the device policy modules include device specific functionality, various different devices from different manufacturers can be more efficiently and robustly supported.

Accordingly, one aspect of the present invention provides a method. A request to load a device policy module into a memory is received. The device policy module is for use by a device driver, and the device policy module includes at least one of a function, a procedure, and an object-oriented method operable to perform at least one of input/output (I/O) operation scheduling, path selection, and I/O operation error analysis. The device policy module is loaded into the memory. The device driver is informed of the availability of the device policy module.

In another aspect of the present invention, a system includes a storage device discovery module and a multipath driver. The storage device discovery module is configured to determine information about at least one storage device belonging to a distributed computing system. The multipath driver is in communication with the storage device discovery module and configured to direct input/output (I/O) operations along at least one of a plurality of communication pathways to the at least one storage device. The multipath driver includes an interface configured to communicate with a device policy module including at least one of a function, a procedure, and an object-oriented method operable to perform at least one of I/O operation scheduling, path selection, and I/O operation error analysis.

In another aspect of the present invention, a computer readable medium comprising program includes instructions executable on a processor. The computer readable medium is at least one of an electronic storage medium, a magnetic storage medium, an optical storage medium, and a communications medium conveying signals encoding the instructions. The program instructions are operable to implement each of: receiving a request to load a device policy module into a memory, wherein the device policy module is for use by a device driver, and wherein the device policy module includes at least one of a function, a procedure, and an object-oriented method operable to perform at least one of input/output (I/O) operation scheduling, path selection, and I/O operation error analysis; loading the device policy module into the memory; and registering the device policy module with the device driver.

Yet another aspect of the present invention provides an apparatus including: a means for directing input/output (I/O) operations along at least one of a plurality of communication pathways to at least one storage device; a means for providing storage device specific I/O operation scheduling and communication pathway selection in conjunction with the means for directing I/O operations; and a means for selectively making the means for providing storage device specific I/O operation scheduling and communication pathway selection available to the means for directing I/O operations.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 3:
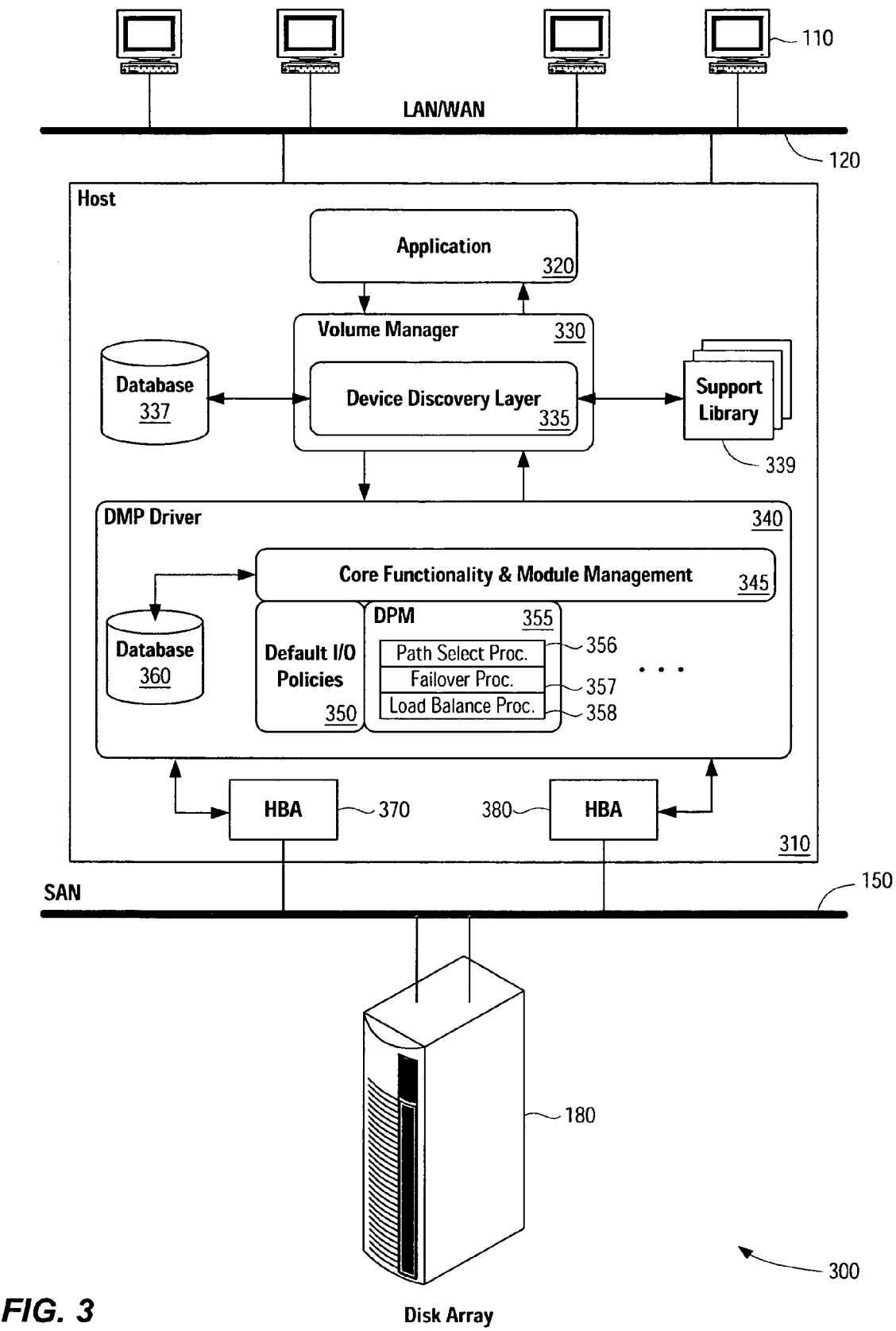
FIG. 3 is a simplified block diagram of portions of a computing system including a host computer system utilizing some of the systems and methods of the present invention.

FIG. 3 is a simplified block diagram of portions of a computing system 300 including a host computer system utilizing some of the systems and methods of the present invention. In the example illustrated, host computer system 310 includes a volume manager 330 that possesses additional functionality in device discovery layer 335. Although illustrated as part of volume manager 330, device discovery layer 335 can be a separate program, or a service available to volume manager 330, e.g., a service provided to a configuration daemon (not shown) of volume manager 330. In general, a configuration daemon corresponds to a process responsible for discovering the attributes of storage devices, such as multipath attributes of disks and disk arrays. Because host computer system 310 can in general be used with a variety of different storage devices such as disk array 180, volume manager 330 and other software components such as DMP driver 340 are designed to operate in a heterogeneous storage environment. Thus, device discovery layer 335 working alone or in conjunction with other portions of volume manager 330 and/or additional software components (not shown) is responsible for discovering various attributes of storage devices, such as multipath attributes of disks and disk arrays. Device discovery layer 335 can also be used to discover enclosure information, if available, from storage devices. Enclosure information can, for example, be used by volume manager 330 to determine an appropriate storage device in which to store certain data.

Device discovery layer 335 stores information about various storage devices in database 337. Moreover, since hardware and/or software characteristics of storage devices can differ significantly, e.g., because of differences among device manufacturers, the procedures used to discover device attributes can differ among devices. Consequently, device discovery layer 335 can use a set of device support libraries 339 that provide device information specific to the storage devices of particular vendors. In one implementation, each device support library in the set of device support libraries 339 is a storage device-specific dynamically loadable library. Thus, support for a particular type of storage device can be added or removed dynamically from without stopping volume manager 330 or rebooting host system 310. Moreover, if a disk array contains active volumes, the disk volumes can remain available during and after the addition or removal of the support.

In order to perform the device discovery function, device discovery layer 335 uses code to scan an operating system device tree in platform-specific manner. In one embodiment, device discovery layer 335 discovers all storage devices available to host computer system 310. In yet another embodiment, partial discovery of available storage devices is achieved using constraint-based discovery. For example, a set of predefined storage device attributes can be used to constrain the discovery process to a subset of the storage devices identifies by the host operating system.

Device discovery layer 335 gathers attributes of the storage devices connected to a host and configures DMP driver 340 for a particular storage device, such as storage device 180, so that volume manager 330 can access and use the device. Configuration of DMP driver 340 enables multipathing features, as described above, within corresponding storage device 180.

In one embodiment, device discovery layer 335 uses SCSI commands to discover attributes of different disk arrays. Use of these commands can be hard-coded into device discovery layer 335, or it can be dictated in whole or in part by information from one or more of the device support libraries 339. The device support libraries typically include one or more functions, procedures, and/or object oriented methods for use in determining storage device attributes. Examples of the types of storage device attributes discovered by device discovery layer 335 include: vendor identification, product identification, enclosure serial number, LUN serial number, disk array type (e.g., A/A, A/P, A/PG, A/PF), and LUN ownership. Still other storage device attributes will be well known to those having ordinary skill in the art. In still another example, dynamic attributes, e.g., storage device attributes that can change between two invocations of a device discovery operation, are supported. In such a situation, a device support library 339 may declare to the device discovery layer 335 that one or more attributes are dynamic. When one of these dynamic attribute is retrieved, a function within the support library can be invoked to get the latest value of the attribute.

Some or all of the storage device attributes discovered by device discovery layer 335 are typically stored in database 337. In one embodiment, database 337 is maintained as a database of name-value pairs called property list. The name is the property name and the value is one of the values of the associated property. This scheme allows a new property to be created with an associated value, and further allows expanding or shrinking the set of values of a particular property. Another component of database 337 can be an association list. This list maintains the association between a <property, value> tuple with another <property, value> tuple. The association list is typically used to maintain the property-values associated with various device discovery layer objects. Access to and manipulation of database 337 is typically handled through an application program interface (API) (not shown) that includes a number of functions, procedures and/or object-oriented methods designed for accessing, modifying, and manipulating data stored in database 337 such as the aforementioned property and association lists.

Device discovery module 335 is responsible for passing storage device information to DMP driver 340. For example, device discovery layer 335 can transmit a stream of opcodes and operands to DMP driver 340. DMP driver 340, and in particular core functionality 345 interprets these instructions and performs a variety of operations based on the instructions such as configuring or reconfiguring its device database 360. In addition to core functionality 345 and device database 360, DMP Driver 340 includes one or more default I/O policies 350 and can include one or more device policy modules 355. Device discovery layer 335 provides I/O policy configuration information to DMP driver 340 only for those storage device types or models which are applicable to the devices discovered by device discovery layer 335. For example, a support library 339 for a particular storage device may specify that the corresponding storage device can (or should) only use a particular array model (e.g., A/A, A/P, A/PG, A/PF). In response, core functionality 345 will ensure that the proper I/O policy is supported by DMP driver 340. This operation might involve loading certain default I/O policy modules or routines, enabling certain default I/O policy modules or routines, and/or de-selecting certain incompatible default I/O policy modules or routines. In one example, default I/O policies 350 includes all default I/O policies supported by the DMP driver, and those policies that are to be used for a particular storage device are noted by core functionality 345. In another example, various default I/O policies are available to DMP driver 340, but only those needed by storage devices in use are loaded into or activated by DMP driver 340.

DMP driver 340 uses the storage device attributes received from device discovery layer 335 along default I/O policies to perform I/O operation scheduling, path failover, and other I/O operations (e.g. SCSI reservation) in the multipath environment of computing system 300. However, because it is not practical for the core functionality of DMP driver 340 to provide an unlimited number of different I/O policies for every possible storage device for use in computing system 300. DMP 340 supports the use of dynamically loadable device policy modules (DPMs) to modify, augment, or replace the fixed set of procedures in storage device-specific manner. Thus, DPMs such as DPM 355 typically include one or more functions, procedures, or object oriented methods for performing various I/O operations. This functionality is typically designed to be device-specific, i.e., the some or all of the functionality of the DPM takes advantage of specific features or attributes of a particular manufacturer's or provider's storage device. Examples of the I/O policy functionality present in DPM 355 include path select procedure 356, failover procedure 357, and load balance procedure 358.

Because each DPM is expected to implement device-specific features, it may be the case that DPMs will be developed by the corresponding storage device vendors. To that end, an application programming interface or some other set of functions and/or procedures can be provided to assist the development of such modules. Moreover, DMP Driver 340 typically includes a set of functions and/or procedures to integrate DPMs with the DMP driver and provide for their management. As shown in FIG. 3, this functionality is part of core functionality & module management 345. In this example, core functionality & module management 345 provides an interface to one or more DPMs loaded in DMP Driver 340. Just as the case with storage device attributes, information about various DPMs can also be stored in database 360. DPMs can come from respective device support libraries 339 or loaded from some other repository. DPMs can be loaded into DMP driver 340 as part of the normal configuration process, e.g., a device is discovered, its attributes determined, and information is provided to the DMP driver, or DPMs can be loaded upon specific request by an application such as application 320.

When making a request to load a DPM, the requesting entity (e.g., an application or other software program) will typically pass a variety of parameters to core functionality 345. Those parameters can include: filename, module name, module version number, number of device types supported by the module, name value pairs describing storage device attributes, flags, and the like. In addition to loading and any DPMs and performing any needed configuration steps, core functionality 345 will typically keep track of loaded modules so that multiple load or unload requests will only cause a single (or none) load/unload of the module. Moreover, because of the dynamic nature of the implementation, unload requests will typically not succeed unless or until a DPM is no longer in use. To further manage operation of the DPM, modules can be designed to register and unregister with the DMP driver by, for example, calling particular functions or procedures, passing parameters, or setting flag values. In typical implementations, some mechanism is used to make the DMP driver aware of the availability or unavailability of DPM modules, and registration and unregistration processes are merely examples. Thus, in some embodiments, the DMP driver may discover the presence or absence of DPM modules, or a third party may inform the DMP driver of DPM module availability/unavailability.

In one embodiment, the process of DPM registration involves a call made by the registering DPM to a registration function along with the passing one or more parameters associated with the module's operation. Examples of such parameters include: a name of the storage device type exported by the module, an I/O policy name, version information, instructions to add/remove/reconfigure a device controlled by the module, current I/O path information, failover initiation commands, failover path information, instructions to issue SCSI commands, and the like. In a similar manner, a DPM can unregister from DMP driver 340 by calling an unregister function. In one example, the unregister call passes the same information as the original register call so that DMP management functionality, e.g., core functionality 345 can accurately identify the correct module and adequately complete the unregistration process. In both examples, the result of the registration/unregistration call can be a message or code indicating either success or failure of the operation.

In a typical implementation, some or all of the components of DMP driver 340 operate in a kernel portion of the host computer system 310's memory. In general, the software components shown in FIG. 3 are divided into those components operating at the kernel level, and those operating at the user level, as is well known in the art. Kernel memory space is generally reserved for the computer operating system kernel and associated programs. Programs residing in kernel memory space typically have unrestricted privileges, including the ability to write and overwrite in user memory space. By contrast, programs residing in user space typically have limited privileges. Thus, depending on the implementation of DMP driver 340. DPM 355 can be a kernel module or a user space module. However, because of the nature of driver software, e.g., the need to interface with low-level portions of the operating system, the need to protect the driver from other programs, the handling of I/O operations, etc., DPMs are typically implemented as kernel module.

Device policy modules such as DPM 355 allow some or all of the built-in device or device-type specific I/O procedures to be substituted by those in the module. As previously noted, default support usually includes support for supports four array models (A A, A/P, A/PG and A/PF). An array model embodies the procedures and functions used to perform a variety of multipathing I/O operations such as: selecting an I/O path when multiple paths to a disk within an array are available, selecting the disk(s) which will be affected due to failure of one of the paths to the disk, selecting an alternate path in case of a path failure, effecting path changeover after a path failure, responding to SCSI reservation/release requests (persistent or otherwise), and implementing I/O operation load balancing schemes. Thus, while DMP driver 340 has default procedures for all the four array models, via policies 350 or other hard-coded support, the DPM facility can be used to add a new array model to the DMP driver or to create a variant within a particular model, wherein the base model supplies some of the procedures which are specific to the variant. In one embodiment, a data structure maintained by DMP driver 340 contains pointers to the array specific functions and procedures present in the one or more DPMs.

Each DPM typically provides such information as part of its registration process.

As noted above, each DPM can implement one or more load balancing schemes which may be device specific. In a simple example for A/A arrays, the load balancing scheme comprises breaking up the storage in the array into contiguous regions whose number depend on a tunable value set by or through the DMP driver. Each region is then assigned to one of the active paths available in a round-robin fashion. Any I/O operation targeting a particular disk region always goes through the assigned path. This has the advantage of round-robin scheduling without loosing the sequential I/O performance benefits due to track caches that are part of the array itself or the individual disks making up the array. This is technique can be referred to as a balanced path algorithm.

Since the size of a track cache can be disk-array specific, this balanced path algorithm may not be optimal in a heterogeneous environment. A track cache property can be optionally discovered by device discovery layer 335 (typically through a support library 339), which will be downloaded to DMP driver 340 to take the place of the DMP tunable parameter of the balanced path algorithm. Such an attribute may be specified at the disk array level or individual LUN level. In the absence of such an attribute, DMP driver 340 can continue to use the aforementioned tunable parameter.

Additionally, low-end disk arrays or JBODs may not have significant amounts of track cache. In such cases, a minimum I/O queue algorithm can be used. Here, DMP driver 340 (typically through a DPM specific to the array or JBOD) schedules I/O operations through a path which has the least number of I/Os pending from the DMP driver. Such arrays can also use round-robin algorithms where the DMP driver or DPM module schedules I/O operations in a round-robin (on average) fashion. In a SAN environment, the balanced path scheduling algorithm may not be optimal because the number of hops may be different for different paths. If DMP driver 340 possesses information about which path will cause the least delay, it can select a path based on this information. To determine the delay, DMP driver 340 can use the time taken to complete an I/O operation to compute an expected throughput for a particular path. Based on that information, path selection occurs such that the larger I/O operations are scheduled through the expected greater throughput path in a proportionate manner.

DMP driver 340 can also gather I/O statistics and periodically calculate a delay per unit transfer (e.g., mean time to transfer a unit load) for all paths. Priorities can then be assigned to the paths in proportion to the measured delay. This approach is called an adaptive priority algorithm. The adaptive priority algorithm can also handle track cache values if specified.

As noted above, DPM 355 can also be used to perform path failover operations. In particular, DPM 355 can implement device specific failover procedures. For example, some disk-arrays use special SCSI commands to change the active path, i.e., the path that is used for performing I/O operations. When DMP driver 340 determines that the current active path is no longer functioning, e.g., I/O operations through the current active path are failing, DMP driver 340 can attempt to use another path as the active path. To perform this failover operation, an array-specific procedure of the DPM 355 can be invoked to issue the SCSI command(s) needed to affect the path change operation.

In any of the aforementioned path selection examples, e.g., failover path selection, load balancing path selection, etc., information about the appropriate path to use can be provided by DPM 355 to DMP driver 340 in a number of ways. In the simplest example, DPM 355 passes one or more parameters to DMP driver 340, e.g., to core functionality 345, and the parameters indicate which path(s) should be used. In another example, DPM 355 supplies one or more functions or procedures that can be called by DMP 340. Such functions or procedures can result in path selection and/or configuration. In general, because DPMs possess information about, or are typically designed for, specific storage devices, they can efficiently provide one or more mechanisms by which a DMP can select appropriate paths for particular tasks.

In still another example, DPM 355 can be used to perform disk-array specific error analysis procedures. For example, when an I/O error occurs, DPM 355 of DMP driver 340 may use a disk-array specific procedure to determine if the path upon which errors are occurring is a read only path. With such information, DMP driver 340 may decide to use the path for read-only operations instead of causing a path failover.

Figure 1:
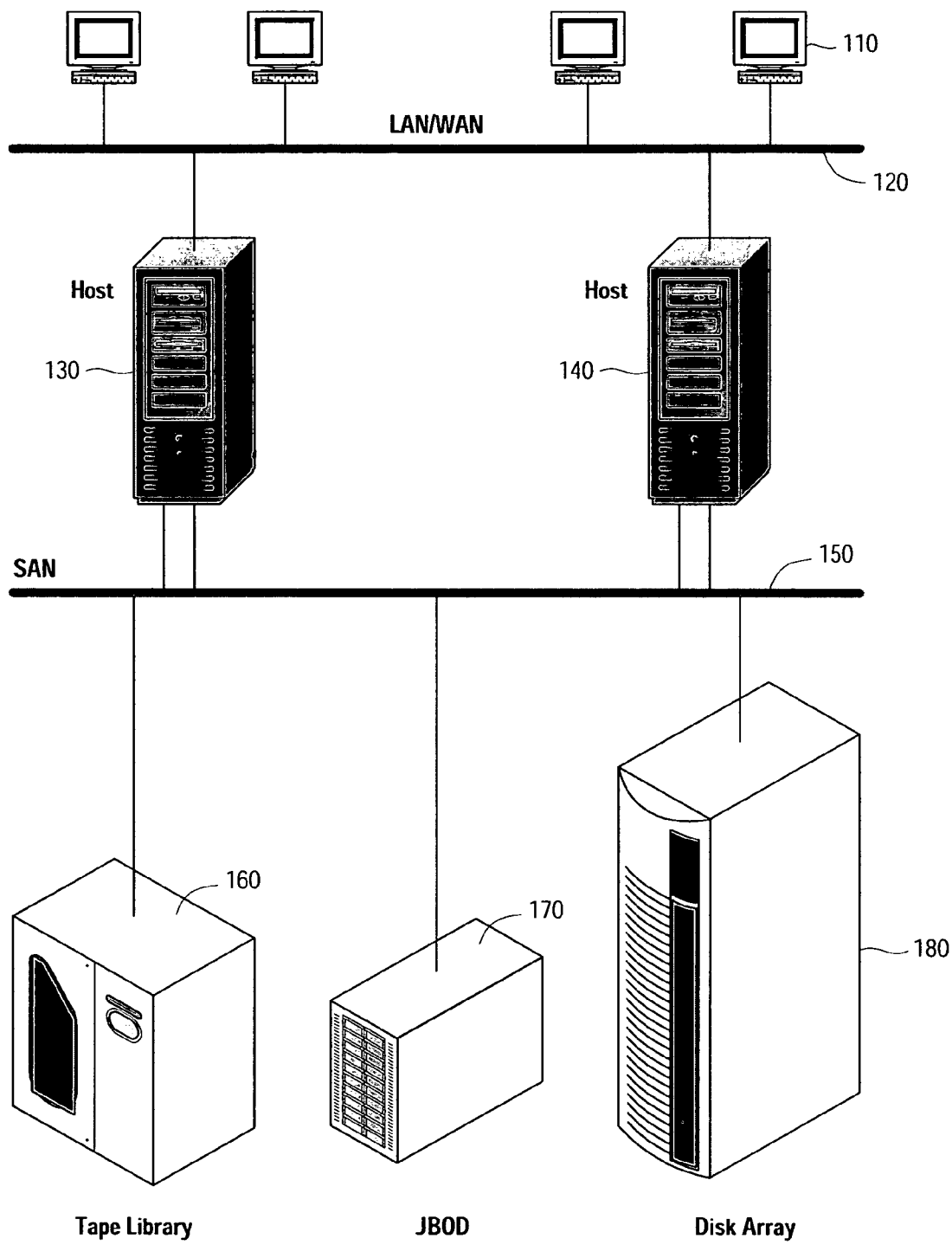
FIG. 1 is a simplified block diagram of a computing system.
Figure 2:
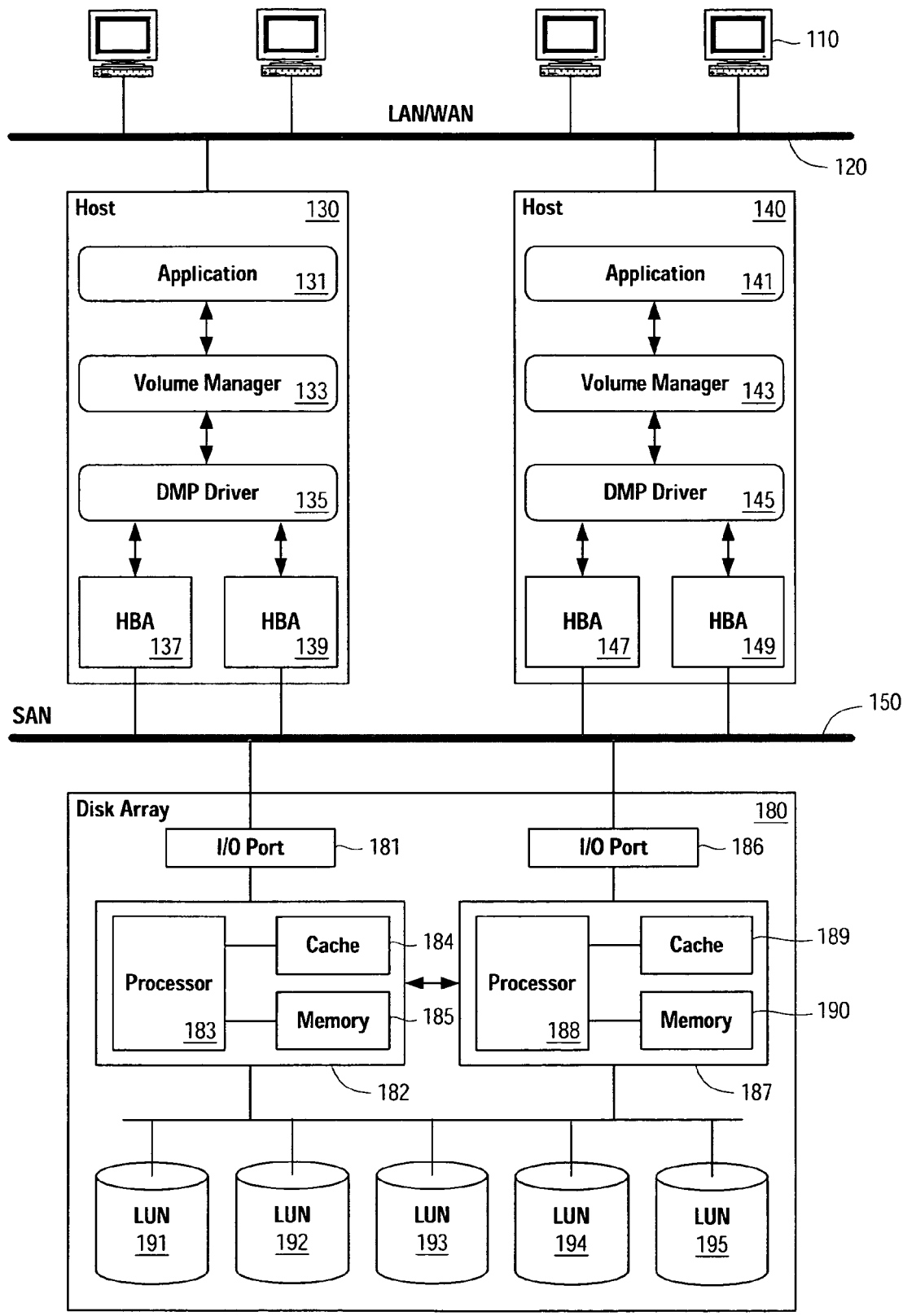
FIG. 2 is a simplified block diagram illustrating in greater detail several components of the computing system shown in FIG. 1.

Other system components illustrated in FIG. 3 function in a manner similar to corresponding components shown in FIG. 2. For example, host bus adapters 370 and 380 provide a hardware interface between the host bus of host computer system 310 and SAN 150. Although the dynamically loadable device policy modules and related DMP driver features have been described in the context of a standard host computer system, it should be noted that these features and functionality can be implemented in a variety of other architectures such as clustered computing systems and specialized storage devices (e.g., SAN switches, SAN routers, SAN hubs, or some type of storage appliance). Moreover, the present systems, methods, devices, and software can be implemented in conjunction with a variety of different virtualization schemes (e.g., host based, appliance based, storage based, in-band, out-of-band, etc.) and indeed with no virtualization scheme at all. Similarly, a variety of different storage devices, and indeed addressable storage objects generally, can be used in conjunction with the methods, devices, and software disclosed.

Figure 4:
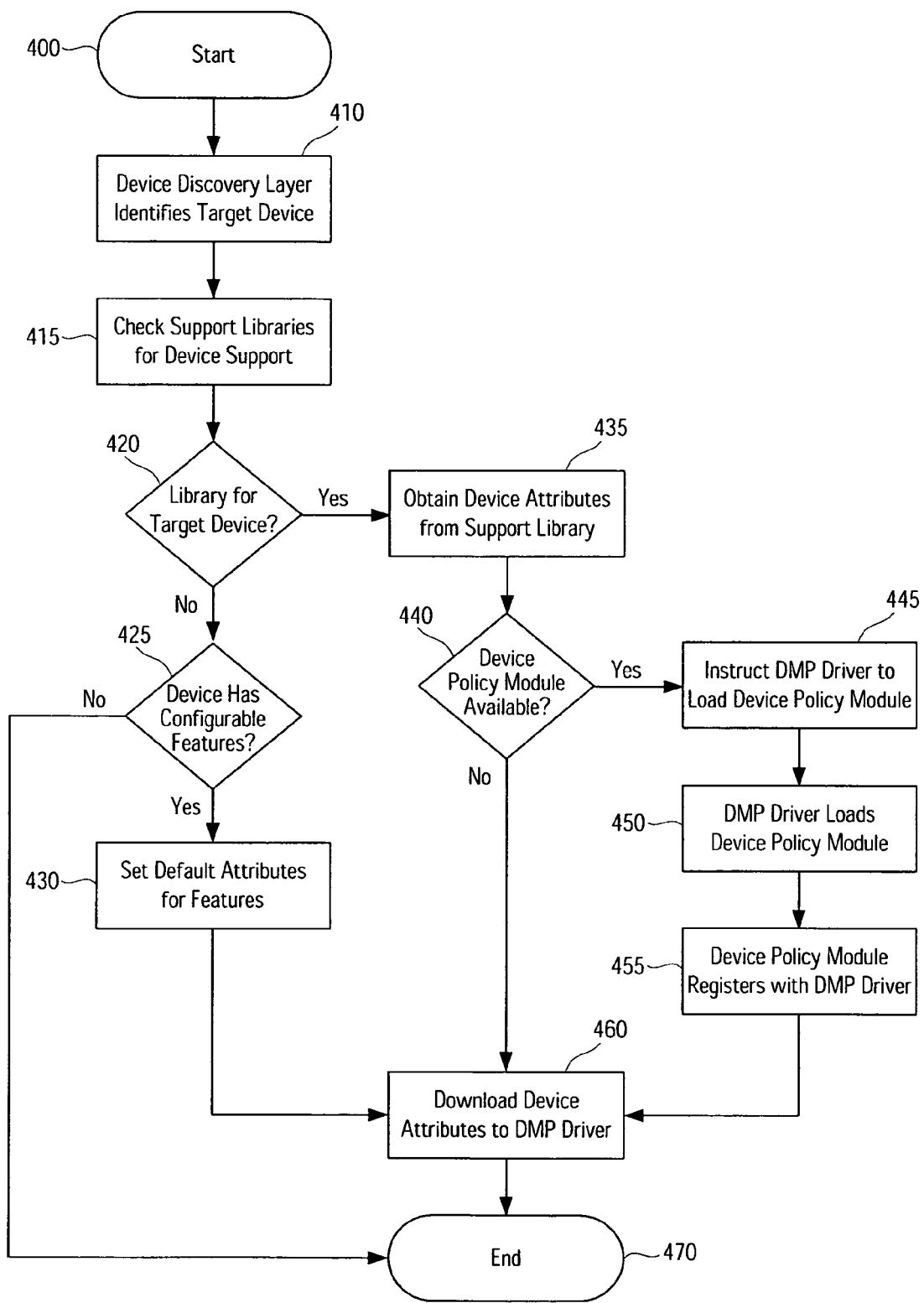
FIG. 4 is a flow chart illustrating techniques of the present invention.

Operation of systems and methods for providing device-specific multipath I/O policies are illustrated in FIG. 4. In particular, a process for loading a DPM is shown at 400. Once the system is initiated, operation begins with 410 where the device discovery layer identifies a specific target storage device that is available for use by the computer system or appliance implementing the discovery functionality. Based on information about the identified target device, the device discover layer further determines whether a support library exists for the target device (415). If such a corresponding support library does exist, as determined in 420, operation transitions to step 435 where device attributes corresponding to the target device are obtained either from the support library itself, or using the support library, e.g., calling functions or procedures provided by the library or executing other code made available through the library. Among the information that can be determined about the target device is whether there is a device policy module available for the target device. This determination is made at 440. Availability of a DPM can be indicated by one or more attribute values, the presence of the DPM itself in the support library, or some similar mechanism. If a corresponding DPM does exist, operation transitions to 445 where the DMP driver is instructed to load the DPM. The DPM is loaded (typically into a kernel portion of memory) in step 450, and the DPM registers with the DMP driver at 455.

Upon completion of the DPM loading and registering, or in the case that there is no DPM available as determined in 440, other device attributes are downloaded to the DMP driver (460). As noted above, various different types of device attributes can be used to configure and manage the DMP driver for use with different storage devices. Moreover, although attribute download step 460 is shown as occurring after the DPM loading steps, this need not be the case. DPM related stapes can be part of the typical attribute downloading process or can be performed after all device attributes have been sent to the DMP driver. In the case of a reconfiguration of a device or an explicit request to load a DPM, e.g., by an application outside of the normal discovery process or activated at a time other than initial configuration of the computing system, attribute downloading might not occur. Upon completion of the attribute downloading, the process terminates at 470.

In the event that there is no support library for the target device, as determined at 420, operation transitions to 425 where it is determined whether the target device has any features for which DMP driver configuration is needed or desired. If so, default attributes are determined (430) and subsequently downloaded (460). If not, the process terminates at 470. Note that in the event that multiple devices need be configured, the entire process illustrated in FIG. 4 can be repeated for each device.

Figure 5:
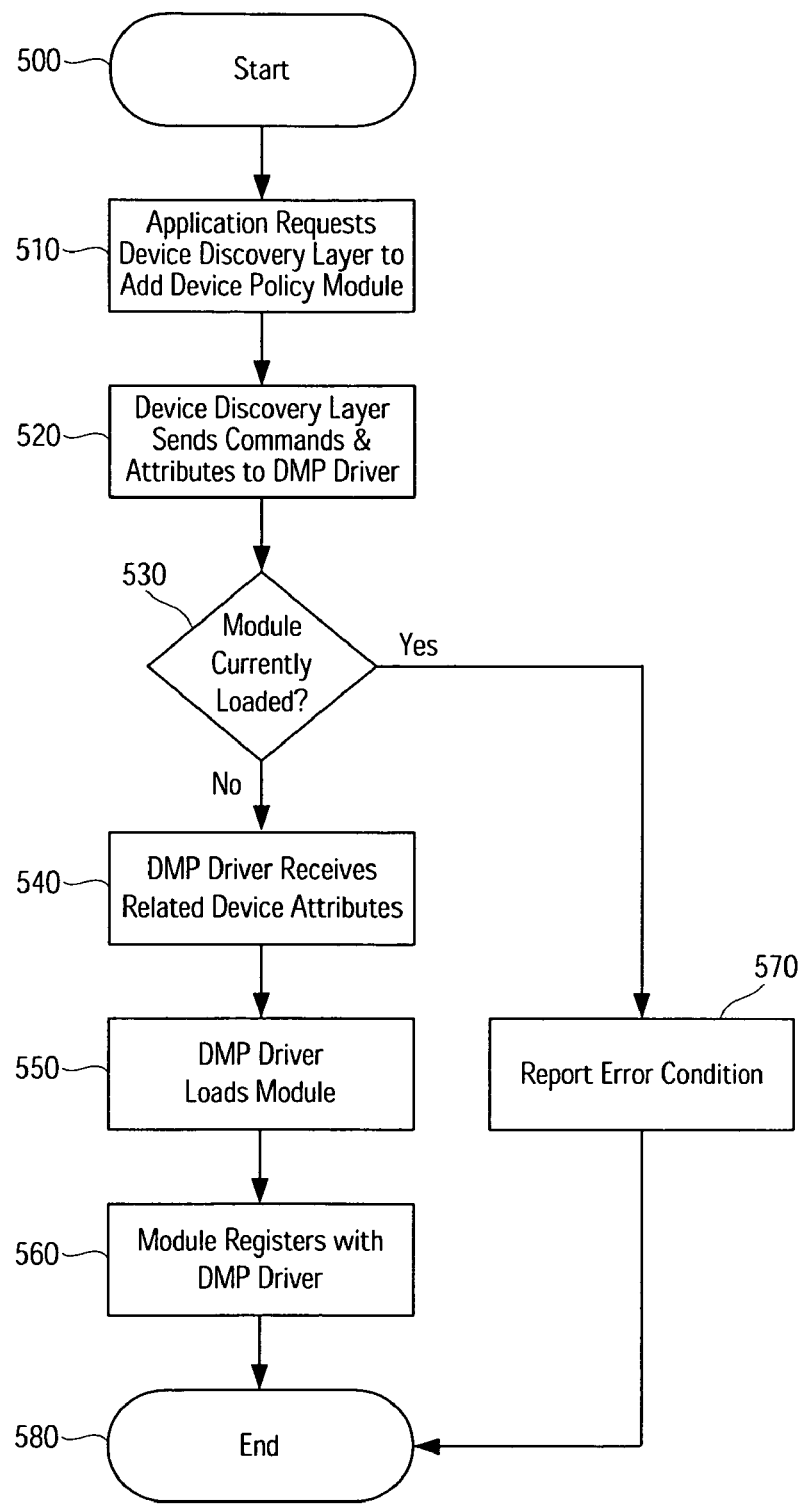
FIG. 5 is a flow chart illustrating techniques of the present invention.

FIG. 5 illustrates an exemplary process 500 whereby an application, e.g., a user application or utility, is used to add a device policy module. This example describes a situation that is typically not part of an automatic device discovery/configuration process such as that shown in FIG. 4. In step 510, an application, typically at the instance of a user, requests the device discovery layer to add a DPM. In an alternate embodiment, the request is made directly to the DMP driver. As shown at 520, the device discovery layer sends certain commands and/or attributes to the DMP driver. Such commands might include an inquiry about the current status of the requested module. Alternately, a simple load command is passed to the DMP driver. In 530, the DMP driver determines whether the requested module is currently loaded. In a typical implementation, only one instance of a particular DPM would be allowed for a particular device. If the module in question is already loaded, an error condition or other message is reported at 570, and operation terminates at 580. If the module is not currently loaded, the DMP driver receives related device attributes as necessary 540. Note that the determination that the module is not currently loaded might be followed by a report back to the device discovery layer and a subsequent transmission of further commands or attributes (not shown). In step 550, the DMP driver loads the requested DPM. In step 560, the DPM registers with the DMP driver. Assuming the registration process succeeds, operation terminates normally at 580. In the event that registration does not succeed, and error condition can also be reported.

Figure 6:
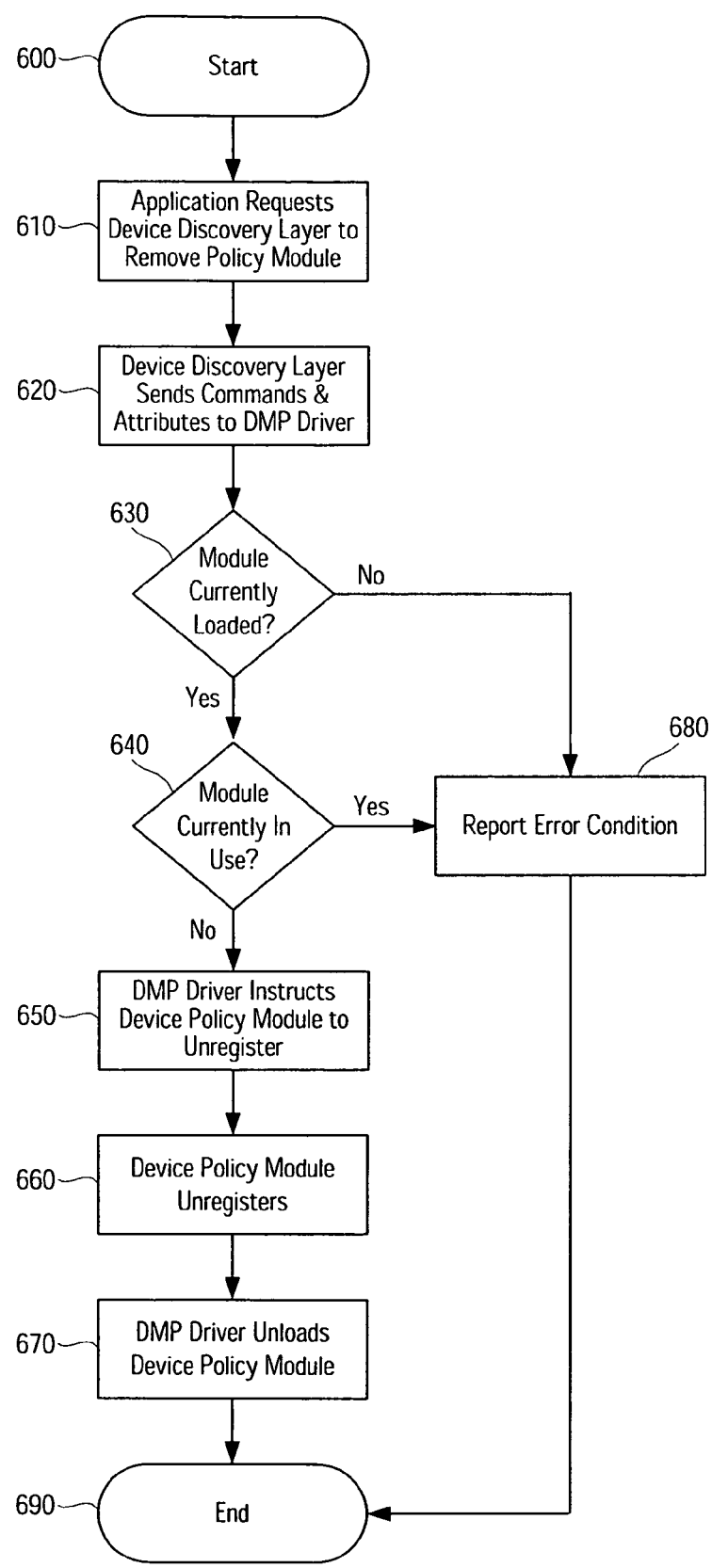
FIG. 6 is a flow chart illustrating techniques of the present invention.

FIG. 6 illustrates the related process 600 of removing a loaded DPM. In step 610, an application requests the device discovery layer to remove a DPM. Again, an alternate embodiment may pass the request directly to the DMP driver. As shown at 620, the device discovery layer sends certain commands and/or attributes to the DMP driver. Such commands might include an inquiry about the current status of the requested module. Alternately, a simple unload command is passed to the DMP driver. In 630, the DMP driver determines whether the requested module is currently loaded. If the module in question is not loaded, an error condition or other message is reported at 680, and operation terminates at 690. If the module is currently loaded, the DMP driver next determines whether the module is be used at the moment for I/O operations (640). If the module is in use and error condition is reported at 680 and operation terminates 690. In an alternate embodiment, the DMP driver will wait until I/O operation performed by the module have quiesced and/or forbid any additional operations to be queued so that the module can be removed.

Once it is safe to remove the module, the DMP driver instructs the DPM to unregister (650). In step 660, the DPM unregisters itself from the DMP driver. In step 670, the DMP driver unloads the module. Assuming the unloading process succeeds, operation terminates normally at 690. In the event that it does not succeed, and error condition can also be reported.

Figure 7:
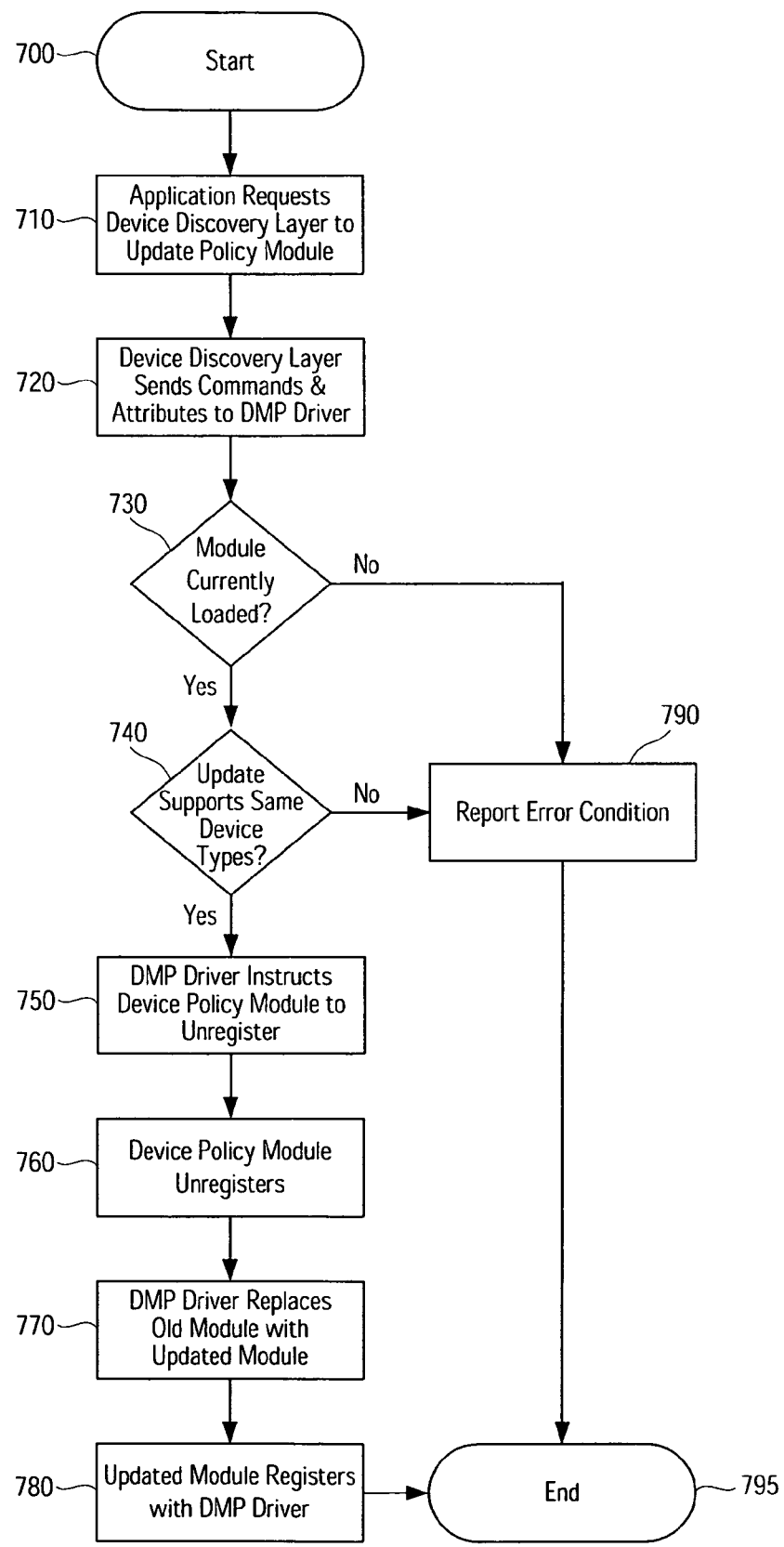
FIG. 7 is a flow chart illustrating techniques of the present invention.

FIG. 7 illustrates still another related process 700 for updating a loaded DPM. In step 710, an application requests the device discovery layer to update a DPM. Again, an alternate embodiment may pass the request directly to the DMP driver. As shown at 720, the device discovery layer sends certain commands and/or attributes to the DMP driver. Such commands might include an inquiry about the current status of the requested module, updated device attributes, updated module attributes, or a replacement module. Alternately, a simple update command is passed to the DMP driver. In 730, the DMP driver determines whether the requested module is currently loaded. If the module in question is not loaded, an error condition or other message is reported at 790, and operation terminates at 795. In an alternate embodiment, and attempt to update a module not loaded can instead cause the module to be loaded based on any update parameters. If the module is currently loaded, the DMP driver next determines whether the updated module or the updates to be made will support the same device types as the current version of the module (740). This operation is undertaken to reduce the chance that an update will disrupt operation of the computing system. If the same device types are not supported by the update, an error condition or other message is reported at 790, and operation terminates at 795.

If the same device types are supported, the operation transitions to 750 where the DMP driver instructs the DPM to unregister (750). In step 760, the DPM unregisters itself from the DMP driver. In step 770, the DMP driver replaces the old module with the new module, or in the case where the update simply requires a change in module configuration, the change is performed. In 780 the updated module registers with the DMP driver. Assuming the registration process succeeds, operation terminates normally at 795. In the event that it does not succeed, and error condition can also be reported.

The flow charts of FIGS. 4-7 illustrate some of the many operational examples of the multipathing techniques disclosed in the present application. Those having ordinary skill in the art will readily recognize that certain steps or operations illustrated in FIGS. 4-7 can be eliminated or taken in an alternate order. Moreover, the methods described in FIGS. 4-7 and many of the modules illustrated in FIG. 3 are typically implemented as one or more software programs for a computer system and are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources.

Figure 8:
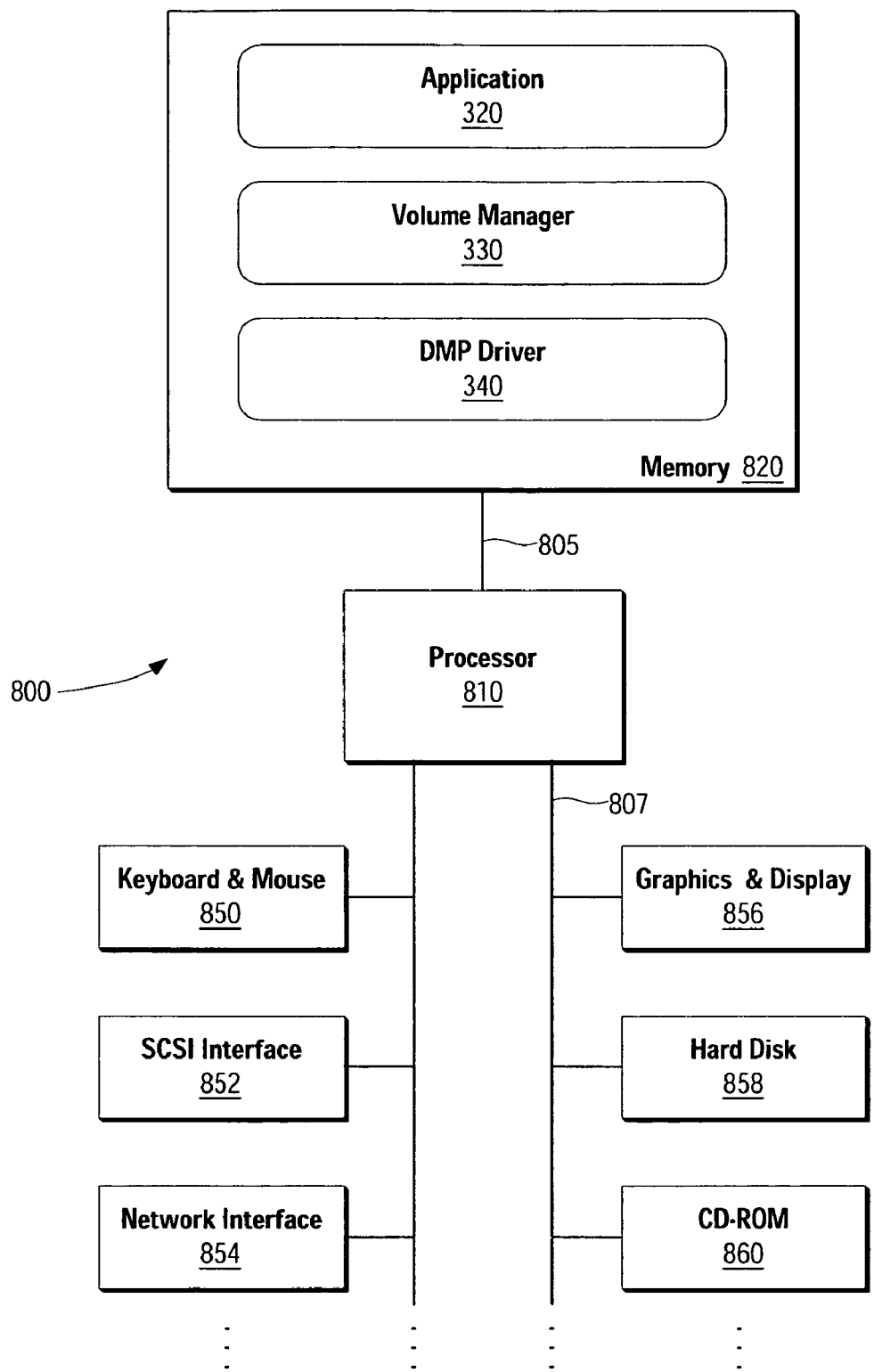
FIG. 8 is a block diagram of a computer system for implementing the techniques of the present invention.

FIG. 8 illustrates a block diagram of a computer system 800 for implementing the fencing techniques of the present invention. For example, computer system 800 can be an embodiment of one of the previously described cluster nodes. Computer system 800 includes a processor 810 and a memory 820 coupled together by communications bus 805. Processor 810 can be a single processor or a number of individual processors working together. Memory 820 is typically random access memory (RAM), or some other dynamic storage device, and is capable of storing instructions to be executed by the processor, e.g., application 320, volume manager 330, and DMP driver 340. Memory 820 is also used for storing temporary variables or other intermediate information during the execution of instructions by the processor 810.

Those having ordinary skill in the art will readily recognize that the techniques and methods discussed below can be implemented in software using a variety of computer languages, including, for example, traditional computer languages such as assembly language, Pascal, and C; object oriented languages such as C++, C#, and Java; and scripting languages such as Perl and Tcl/Tk. Additionally, software 320, 330, and 340 can be provided to the computer system via a variety of computer readable media including electronic media (e.g., flash memory), magnetic storage media (e.g., hard disk 858, a floppy disk, etc.), optical storage media (e.g., CD-ROM 860), and communications media conveying signals encoding the instructions (e.g., via a network coupled to network interface 854).

Computer system 800 also includes devices such as keyboard & mouse 850, SCSI interface 852, network interface 854, graphics & display 856, hard disk 858, and CD-ROM 860, all of which are coupled to processor 810 by communications bus 807. It will be apparent to those having ordinary skill in the art that computer system 800 can also include numerous elements not shown in the figure, such as additional storage devices, communications devices, input devices, and output devices, as illustrated by the ellipsis shown. An example of such an additional computer system device is a fibre channel interface.

Although the present invention has been, in some cases, described is in terms of providing support for multipath disk arrays, the present invention can also be used to support disk arrays having only a single path. Multipath disk arrays are used to illustrate the usefulness of the invention, although one of skill in the art will recognize that the invention is not limited to support for multipath disk arrays. In contrast, the present invention can be used in conjunction with a variety of different types of storage devices including discrete disks, solid state storage devices (including flash memory), storage appliances, and other storage devices.

Loadable module techniques as described herein can also be applied to other remote device access technologies. For example, standard protocols, e.g., the SCSI protocol, can be extended to provide some common functionality in different ways, or manufacturers may disagree on some interpretation aspects of a standard and provide different behaviors in their devices. Consequently, the loadable module techniques provide extensible, polymorphic, uniform mechanisms for accessing this non-standard but common functionality or for providing specific handling for different behaviors that cannot be efficiently handled by common code. Using simple type-specific loadable modules with a set of attributes and functionality handlers, allows accommodation of unusual new devices without having to change established products. Moreover, one can rely on either a storage device vendors of such a new device or on storage management software vendors to provide the module to handle this new device. This technique generally has broad application and can also be used, for example, to access extended protocol mechanisms using protocols other than the block access protocols like SCSI.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. An apparatus comprising:
  means for storage device discovery configured to gather information regarding at least one storage device, wherein
    a distributed computing system is comprised of the at least one storage device;
  means for directing input/output (I/O) operations along at least one of a plurality of communication pathways to the at least one storage device;
  means for providing storage-device-specific I/O operation scheduling and communication pathway selection in conjunction with the means for directing I/O operations;
  means for selectively making the means for providing storage-device-specific I/O operation scheduling and communication pathway selection available to the means for directing I/O operations; and
  multipath driver in communication with the means for storage device discovery and configured to direct input/output (I/O) operations along at least one of the communication pathways to the at least one storage device.

2. The apparatus of claim 1 further comprising:
  means for discovering the presence of at least one storage device belonging to a distributed computing system; and
  means for communicating information about the at least one storage device to the means for directing I/O operations.

3. The apparatus of claim 1 further comprising:
  means for registering the means for providing storage-device-specific I/O operation scheduling and communication pathway selection with the means for directing I/O operations.

4. The apparatus of claim 1 wherein the means for directing I/O operations further comprises means for providing a fixed set of I/O policies including at least one of a function, a procedure, and an object-oriented method operable to perform at least one of I/O operation scheduling, path selection, and I/O operation error analysis.

5. The apparatus of claim 1, further comprising:
  means for loading the means for directing I/O operations along the at least one of the plurality of communication pathways to the at least one storage device.

6. A method comprising:
  gathering information regarding at least one storage device, wherein
    the gathering is performed by a storage device discovery module, and a distributed computing system comprises the at least one storage device;

directing input/output (I/O) operations along at least one of a plurality of communication pathways to the at least one storage device, wherein
the directing is performed by a multipath driver, and
the storage device discovery module and multipath driver are coupled to one another;

providing storage-device-specific I/O operation scheduling and communication pathway selection in conjunction with the directing the I/O operations, wherein
the providing is performed by a device policy module; and selectively making the device policy module available to the multipath driver.

7. The method of claim 6 further comprising:
discovering the presence of at least one storage device belonging to a distributed computing system; and
communicating information about the at least one storage device to the multipath driver.

8. The method of claim 6 further comprising:
registering the device policy module with the multipath driver.

9. The method of claim 6, wherein the directing I/O operations further comprises:
providing a fixed set of I/O policies including at least one of a function, a procedure, and an object-oriented method operable to perform at least one of I/O operation scheduling, path selection, and I/O operation error analysis.

10. The method of claim 6, further comprising:
loading the multipath driver along the at least one of the plurality of communication pathways to the at least one storage device.

11. The computer system comprising:
at least one processor;
a computer-readable storage medium coupled to the at least one processor; and
computer-code, encoded in the computer-readable storage medium, configured to cause the at least one processor to
gather information regarding at least one storage device, wherein the gathering is performed by a storage device discovery module, and
a distributed computing system comprises the at least one storage device,
direct input/output (I/O) operations along at least one of a plurality of communication pathways to the at least one storage device, wherein
the directing is performed by a multipath driver, and
the storage device discovery module and multipath driver are coupled to one another,
provide storage-device-specific I/O operation scheduling and communication pathway selection in conjunction with the directing I/O operations, wherein
the providing is performed by a device policy module, and
selectively make the device policy module available to the multipath driver.

12. The computer system of claim 11, wherein the computer code is further configured to cause the processor to:
discover the presence of at least one storage device belonging to a distributed computing system; and
communicate information about the at least one storage device to the multipath driver.

13. The computer system of claim 11, wherein the computer code is further configured to cause the processor to:
register the device policy module with the multipath driver.

14. The computer system of claim 11, wherein the computer code configured to direct I/O operations is further configured to cause the processor to
provide a fixed set of I/O policies including at least one of a function, a procedure, and an object-oriented method operable to perform at least one of I/O operation scheduling, path selection, and I/O operation error analysis.

15. The computer system of claim 11, wherein the computer code is further configured to cause the processor to:
load the multipath driver along the at least one of the plurality of communication pathways to the at least one storage device.

16. A computer-readable storage medium comprising computer code, when executed, the computer code is configured to cause a processor to
gather information regarding at least one storage device, wherein
the gathering is performed by a storage device discovery module, and
a distributed computing system comprises the at least one storage device;
direct input/output (I/O) operations along at least one of a plurality of communication pathways to the at least one storage device, wherein
the directing is performed by a multipath driver, and
the storage device discovery module and multipath driver are coupled to one another;
provide storage-device-specific I/O operation scheduling and communication pathway selection in conjunction with the directing the I/O operations, wherein
the providing is performed by a device policy module; and
selectively make the device policy module available to the multipath driver.

17. The computer-readable storage medium of claim 16, wherein the computer code, when executed, is further configured to cause the processor to
discover the presence of at least one storage device belonging to a distributed computing system; and
communicate information about the at least one storage device to the multipath driver.

18. The computer-readable storage medium of claim 16, wherein the computer code, when executed, is further configured to cause the processor to
register the device policy module with the multipath driver.

19. The computer-readable storage medium of claim 16, wherein the computer code configured to direct I/O operations, when executed, is further configured to cause the processor to:
provide a fixed set of I/O policies including at least one of a function, a procedure, and an object-oriented method operable to perform at least one of I/O operation scheduling, path selection, and I/O operation error analysis.

20. The computer-readable storage medium of claim 16, wherein the computer code, when executed, is further configured to cause the processor to:
load the multipath driver along the at least one of the plurality of communication pathways to the at least one storage device.

* * * * *